United States Patent
Grosspietsch et al.

(10) Patent No.: US 6,644,451 B2
(45) Date of Patent: Nov. 11, 2003

(54) RELEASE MECHANISM FOR A DOUBLE CLUTCH ASSEMBLY

(75) Inventors: Wolfgang Grosspietsch, Schweinfurt (DE); Angelika Ebert, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/908,086

(22) Filed: Jul. 18, 2001

(65) Prior Publication Data

US 2002/0014385 A1 Feb. 7, 2002

(30) Foreign Application Priority Data

Jul. 27, 2000 (DE) .......................... 100 36 675

(51) Int. Cl.[7] .......................... F16D 21/06; F16D 23/14
(52) U.S. Cl. .................. 192/48.8; 192/89.23; 192/98; 29/444
(58) Field of Search .................. 192/48.8, 48.91, 192/70.27, 89.23, 98, 101; 29/434, 444

(56) References Cited

U.S. PATENT DOCUMENTS

| | | | | |
|---|---|---|---|---|
| 2,237,322 A | * | 4/1941 | West | 192/48.8 |
| 3,212,611 A | * | 10/1965 | Ruoff et al. | 192/48.8 |
| 3,841,455 A | * | 10/1974 | Eastwood | 192/48.8 X |
| 4,116,322 A | * | 9/1978 | Ashfield | 192/48.8 |
| 4,667,800 A | * | 5/1987 | Lassiaz et al. | 192/98 |
| 4,787,492 A | * | 11/1988 | Ball et al. | 192/48.8 |
| 5,513,734 A | * | 5/1996 | Scotti | 192/70.27 |

FOREIGN PATENT DOCUMENTS

| | | |
|---|---|---|
| DE | 887 589 | 8/1953 |
| DE | 1 292 962 | 4/1969 |
| EP | 0 185 176 | 6/1986 |
| FR | 1.479.400 | 5/1967 |
| GB | 635042 | 3/1950 |

* cited by examiner

*Primary Examiner*—Richard M. Lorence
(74) *Attorney, Agent, or Firm*—Cohen, Pontani, Lieberman & Pavane

(57) ABSTRACT

A release bearing is provided for transmitting release force to a corresponding force accumulator of each of the first and second clutch regions of the double clutch assembly, the release bearings being arranged in succession in the direction of an axis of rotation. Each of the release bearings has an action region for a respective release-force transmission member to act on, the release-force transmission members interacting on the same axial side of the release bearings. The action region of one of the release bearings includes a sleeve-like action element which is surrounded by the other release bearing. The sleeve-like action element has a holding region, by means of which the other release bearing is secured so that it cannot be removed from the sleeve-like action element.

10 Claims, 1 Drawing Sheet

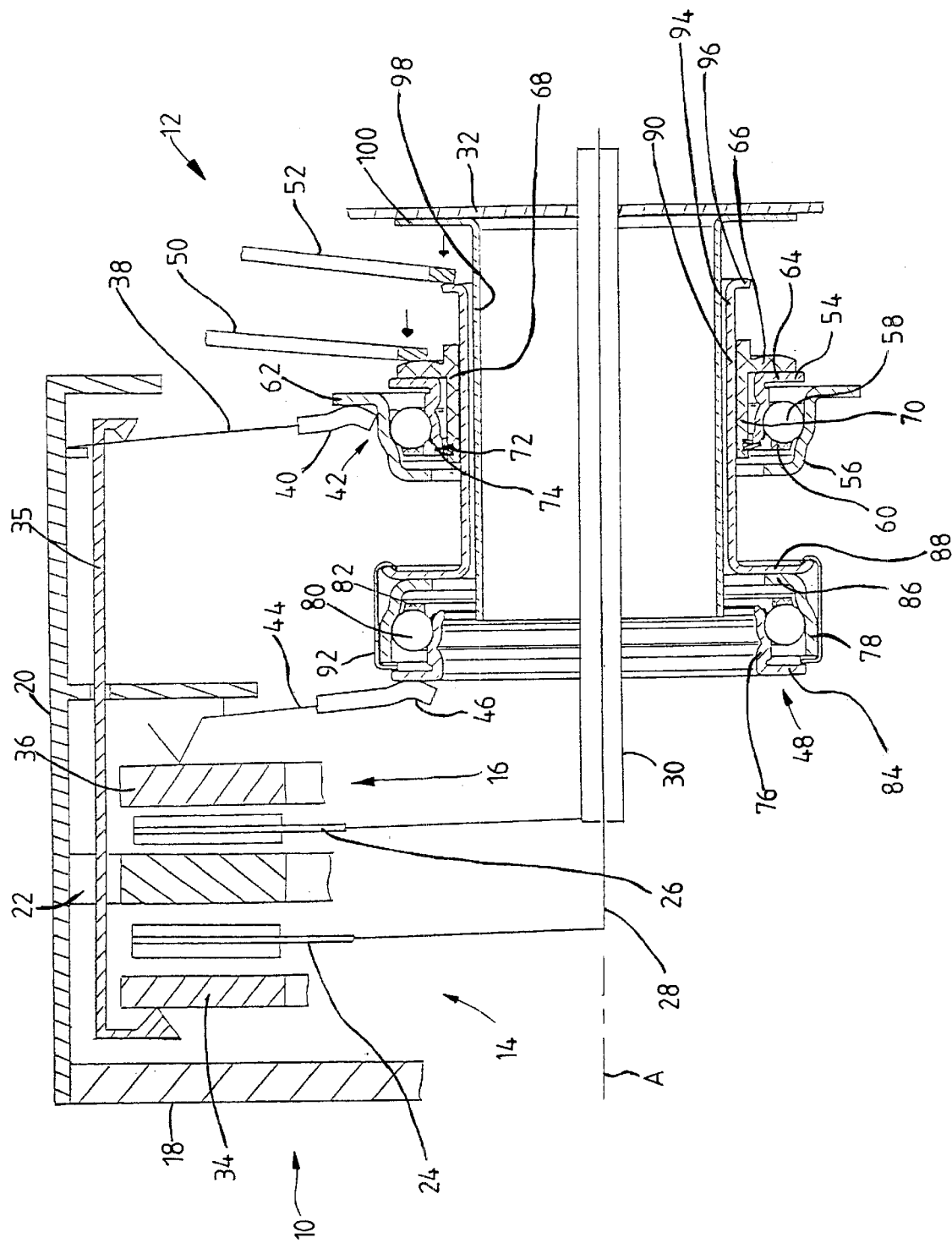

RELEASE MECHANISM FOR A DOUBLE CLUTCH ASSEMBLY

BACKGROUND OF THE INVENTION

1. Field of the Invention

The present invention relates to a release mechanism for a double clutch assembly, comprising, for each clutch region of the double clutch assembly, a release bearing for transmitting release force to a corresponding force accumulator of the clutch regions. The release bearings are arranged in succession in the direction of an axis of rotation, and each of the release bearings has an action region for a respective release-force transmission member to act on. The release-force transmission members assigned to the two release bearings interacting, with regard to the release bearings, on the same axial side with their respectively associated action regions. The action region of one of the release bearings has a sleeve-like action element, which is surrounded on the radially outer side by the other release bearing.

2. Description of the Related Art

EP 0 185 176 discloses a double clutch assembly with an associated release mechanism, in which the two release bearings are positioned in succession in the axial direction, with regard to the axis of rotation of the overall system, and approximately in the same radial region. This allows the two release bearings to be of relatively small construction in the radial direction, with the result that the circumferential velocities in rotation mode are relatively low and therefore the load on and wear to the release bearings can be kept at low levels, in particular even when used in systems which have relatively high rotational speeds, such as for example passenger automobiles. In this known arrangement, the release force is applied to the release bearings via respective action regions, which are in the form of annular pistons and are arranged concentrically with respect to one another in a component which has two cylinder chambers of annular design.

DE-C 1 292 962 discloses a double clutch assembly with an associated release mechanism in which the two release bearings each have sleeve-like action elements which are designed, for example, to interact with respective release forks or the like. The sleeve-like action element of one of the release bearings is arranged on the sleeve-like action element of the other release bearing.

SUMMARY OF THE INVENTION

The object of the present invention is to provide a release mechanism with a modular design. A further aim of the present invention is to provide a method for assembling a release mechanism of this type.

According to a first aspect of the present invention, the above object is achieved by a release mechanism for a double clutch assembly, comprising, for each clutch region of the double clutch assembly, a release bearing for transmitting release force to a corresponding force accumulator of the clutch regions. The release bearings are arranged in succession in the direction of an axis of rotation, and each of the release bearings has an action region for a respective release-force transmission member to act on. The release-force transmission members assigned to the two release bearings interact, with regard to the release bearings, on the same axial side with their respectively associated action regions. The action region of one of the release bearings has a sleeve-like action element, which is surrounded on the radially outer side by the other release bearing.

According to the invention, the sleeve-like action element has a holding region, by means of which the other release bearing is secured so that it cannot be removed from the sleeve-like action element.

The provision of the holding region ensures that, even just before coupling to the respective release-force transmission members, the two release bearings are held together and thereby form a modular assembly which, by way of example, can be provided in this form by a separate supplier and can be incorporated into a drive system as a unit. This simplifies the operation of assembling a drive system of this type.

The provision of a holding region on the sleeve-like action element does not necessarily mean that these two assemblies are configured integrally, i.e. as a single part. In this context, it is also possible for a separate component, which substantially provides the holding region, to be arranged on or fixed to the action element. For reasons of simplified manufacture and also for cost reasons, however, it is preferable for the holding region to be formed by deformation, preferably rolling up, of an end region of the sleeve-like action element.

To achieve integration of functions in particular in the region of the sleeve-like action element and to allow the latter to be provided with a simplified technical design, it is proposed that the holding region interact with the associated release-force transmission member.

Furthermore, it is preferably provided, in the release mechanism according to the invention, for the other release bearing to be supported, by means of its action region, on the sleeve-like action element of the first release bearing.

In order to keep the loads which occur in the region of the individual clutch operator members as low as possible, it is proposed for each release bearing to have a plurality of bearing bodies, preferably balls, which are arranged in succession in the circumferential direction around the axis of rotation, and for the bearing bodies of the two release bearings to radially overlap one another, at least in regions.

By way of example, it is possible for the bearing bodies of the two release bearings to be arranged substantially in the same radial region.

In order to hold the release mechanism in a defined position in the overall drive system, it is proposed for the sleeve-like action element to be supported on a preferably sleeve-like guide element. By way of example, it is possible for the guide element to be intended to be fixed to a stationary assembly, preferably a transmission casing.

According to a further aspect of the present invention, the above-mentioned object is achieved by a method for assembling a release mechanism according to the invention, which comprises the following steps:

a) pushing the other release bearing onto the sleeve-like action element, b) then preparing a holding region in one of the end regions of the sleeve-like action element by deformation of the sleeve-like action element or by fitting a holding element to the sleeve-like action element.

To further simplify the assembly operation and, furthermore, to ensure that the first release bearing is held on the sleeve-like action element of the other release bearing in a defined way, it is proposed that, prior to step a), the sleeve-like action element be deformed in its other end region, in order to form a further holding region. It is then furthermore possible to provide for, before or after step a) and/or step b), a bearing ring of the first release bearing to be connected to the further holding region of the sleeve-like action element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE shows a partially diagrammatical illustration of a double clutch assembly with a release mechanism according to the invention.

DETAILED DESCRIPTION OF THE PRESENTLY PREFERRED EMBODIMENTS

In the FIGURE, the double clutch assembly 10 is only outlined, in order to illustrate the interaction between the release mechanism 12 and the double clutch assembly 10 or the two clutch regions 14, 16 thereof. Ultimately, the double clutch assembly 10 may be constructed in any desired form.

In the example illustrated, the double clutch assembly 10 comprises a flywheel 18, which may also be designed as a two-mass flywheel and may be connected to a drive shaft in order to rotate together with the latter about an axis of rotation A. A casing arrangement 20 is connected to the flywheel 18. An intermediate disk 22, on the two axial sides of which the clutch disks 24 and 26 of the two clutch regions 14, 16 can come to bear with friction, is connected to the casing arrangement 20 in a rotationally fixed and preferably also axially fixed manner.

These two clutch disks 24, 26 are or can be connected to respective transmission input shafts 28 and 30, respectively, in a rotationally fixed but axially moveable manner. The two transmission input shafts 28, 30 are arranged coaxially with respect to one another and with respect to the axis of rotation A and, in a known way, pass through a transmission casing 32 in a fluid-tight manner.

Furthermore, clutch regions 14, 16 have respective pressure plates 34, 36 which are supported in the casing arrangement 20 in a substantially rotationally fixed manner but displaceably in the direction of the axis of rotation A.

The pressure plate 34 of the first clutch region 14 is acted on by at least one force-transmission member 35, which in turn is acted on, in terms of force, by a first force accumulator 38, for example a diaphragm spring, which is assigned to the clutch region 14. In its radially outer region, this force accumulator 38 is supported on the casing arrangement 20, and radially inside this support it acts on the at least one force-transmission member 35, while in its radially inner region 40 it is intended to be acted on, in terms of force, by a first release bearing 42.

The pressure plate 36 of the second clutch region 16 is acted on by a second force accumulator 44, which in its radially outer region acts on the pressure plate 36, is supported on the casing arrangement 20 radially inside this point of action and in its radially inner region 46 is intended to be acted on by a release bearing 48 of the release mechanism 12. It can therefore be seen that, by means of the two force accumulators 38, 44, the two pressure plates 34, 36 are in principle preloaded toward the associated clutch disks 24, 26 and therefore, by clamping the clutch disks 24, 26 between the pressure plates 34, 36 and the intermediate disk 22, the double clutch assembly 10 is in principle preloaded into a state in which both clutch regions 14, 16 are ready to transmit torque. It is possible to provide a very wide range of arrangements, especially in terms of the interaction of the force accumulators 38, 44 with the associated pressure plates 34, 36, and also whether the force transmitted via the release bearings 42, 48 to the force accumulators 38, 44 serves to release the clutch or serves to bring a respective clutch region 14 or 16 into the engaged state, counter to the preloading of the force accumulators or of one of the force accumulators. For the purposes of the present invention, the force which is transmitted by the release bearings and the force which is transmitted to these bearings by the respective release-force transmission members 50, 52, for example release forks, is referred to as a release force; if the double clutch assembly is given a suitably different design, this force may, of course, also mean the transmission of a force which is used to engage the clutch.

The first release bearing 42 comprises two bearing rings 54, 56, which are formed, for example, by deformation of sheet-metal material and between the race surfaces of which a plurality of bearing bodies, for example bearing balls 58, are arranged. These bearing bodies 58 may be held together by a cage 60. The release bearings 42, 48 are only illustrated symbolically as representative of a very wide range of release bearings which may be sealed in various regions or in which the bearing bodies 58 are supported on bearing surfaces which lie in other regions.

The outer bearing ring 56 has a flange-like region 62 which projects outward and is intended to interact, in terms of force transmission, with the radially inner end region 40 of the force accumulator 38. The inner bearing ring 54 likewise has a flange-like or annular projection 64, on which, in the axial direction, a corresponding flange-like or annular section 66 of a sleeve-like action element 68 is supported. In this case, the release-force transmission member 50 engages on the flange-like section 66 in order to act on the release bearing 42.

It can be seen that a groove-like recess 72, in which a securing ring 74 which connects the action element 68 securely to the inner bearing ring 54 engages, is provided in the sleeve-like section 70 of the action element 68.

The second release bearing 48 also comprises an inner bearing ring 76 and an outer bearing ring 78, on the bearing surfaces of which respective bearing bodies 80, for example balls once again, are supported. These balls too may be held together by a cage 82. The inner bearing ring 76 has an annular or flange-like section 84, on which the radially inner region 46 of the force accumulator 44 bears in order to transmit force. The outer bearing ring 78 has a corresponding flange-like or annular section 86 which engages radially inward and against which a corresponding flange-like or annular section 88 of a further sleeve-like action element 90 bears in the axial direction. The outer bearing ring 78 and the sleeve-like action element 90 are securely connected to one another by one or more elastic clamp elements 92. For this purpose, the flange section 88 is also bent over slightly in the axial direction in its radially outer region, so that the clamp element(s) 92 can engage behind this region and thereby produce a secure fixing without the risk of these clamp elements 92 becoming detached radially outward.

In its end region 94 which is remote from the release bearing 48, the sleeve-like action element 90 has a further annular or flange-like region 96 which projects radially outward and on which the release-force transmission member 52 then engages in the axial direction.

It can be seen from the FIGURE that the first release bearing 42 or its sleeve-like action element 68 surrounds the sleeve-like action element 90 of the second release bearing 48 on the radially outer side or is guided so that it can move in the axial direction thereof. In a corresponding way, the sleeve-like action element 90 of the release bearing 48 is guided on a sleeve-like guide element 98 so that it can move in the direction of the axis of rotation A, and this guide element can in turn be fixed to the transmission casing 32 by threaded bolts or the like.

The two interaction regions between release-force transmission members 50, 52 and the sleeve-like action elements 68, 90, which in each case form the action regions of the release bearings 42, 48, lie—with respect for example to the release bearing 42—on the same axial side, i.e. both sleeve-like action elements 68, 90 are acted on by the associated release-force transmission member 50, 52 on the same axial side of the release bearing 42. For this purpose, the sleeve-like action element 90 ultimately bridges the release bearing 42 and therefore produces a force-transmitting interaction between the release-force transmission member 52 and the release bearing 48. In the arrangement according to the invention, therefore, the interaction regions between the action elements 68, 90 and the associated release-force transmission member 50, 52 are arranged axially following the release bearings 42, 48 per se and are not axially staggered with respect to the latter.

As a result of the sleeve-like action element 90 being provided with the flange-like or annular section 96, it is ultimately provided with a holding region, by means of which the entire release bearing 42 together with the associated sleeve-like action element 68 is held on the sleeve-like action element 90, specifically in such a manner that it can be displaced in the axial direction. Ultimately, the release bearing 42 is secured against being removed from the sleeve-like action element 90 by being held between the two annular holding regions 88, 96 of this element. In this way, the release mechanism 12 can ultimately be provided as a module which can be supplied in the prefabricated state and therefore can easily be incorporated into a drive system or a double clutch assembly.

For production, the procedure is that firstly the sleeve-like action element 90 is deformed in an end region, in order to form the annular or flange-like section 88. Before or after the release bearing 48 has been fixed to this section 88, the release bearing 42 is pushed axially, by means of its sleeve-like action element 68, onto the sleeve-like action element 90. Then, the end region 94 of the sleeve-like action element 90 is deformed, for example is rolled up, in order to form the section 96, which forms both the holding region for holding the release bearing 42 on the sleeve-like action element 90 and the interaction region for interaction with the release-force transmission member 52.

Furthermore, it is possible for this assembly, which has now been assembled, already to have been put together with the sleeve-like guide element 98. In this case this sleeve-like guide element 98 could also be spread open radially outward in its end region remote from the transmission casing 32, in order to prevent the sleeve-like action element 90 from being removed in the axial direction from the sleeve-like guide element 98. This guide element already has, in its region which is provided for fixing to the transmission casing 32, an annular or flange-like projection 100, which in the other axial direction forms a movement stop for the sleeve-like action element 90.

In a modified design variant of the release mechanism according to the invention, in order to prepare the flange-like region or holding region 96 at the location of deformation of the sleeve-like action element 90, it is possible to arrange a separate holding element at the end region 94 of the action element 90, for example by being welded on or by being fixed by means of holding clamping rings or the like.

The present invention provides a release mechanism which can easily be designed in modular form and can then be incorporated, as a prefabricated module, into a drive system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A release mechanism for a double clutch assembly comprising a first clutch region and a second clutch region which are arranged coaxially about an axis of rotation, said mechanism comprising a first release bearing for transmitting release force to a first force accumulator of the first clutch region, a first action region for transmitting release force from a first release force transmission member to said first release bearing, a second release bearing for transmitting release force to a second force accumulator of the second clutch region, said second release bearing being arranged axially in succession with said first release bearing with respect to said axis of rotation, and a second action region for transmitting release force from a second release force transmission member to said second release bearing, said first and second release force transmission members acting on the same axial side of respective first and second action regions, said second action region comprising a sleeve-like action element surrounded by said first release bearing, said sleeve-like action element having two radially outward extending holding regions for axially retaining said first release bearing between said holding regions, wherein said sleeve-like action element has end regions which are formed radially outward to form said holding regions.

2. A release mechanism as in claim 1 wherein one of said holding regions is borne against by said second release force transmission element.

3. A release mechanism as in claim 1 wherein said sleeve-like element is a second sleeve-like element, said mechanism further comprising a first sleeve-like element for transmitting release force from said first release force transmission element to said first release bearing, said first sleeve-like element supporting said first release bearing on said second sleeve-like element.

4. A release mechanism as in claim 1 wherein each of said release bearings comprises a plurality of bearing bodies arranged circumferentially about the axis of rotation, said bearing bodies of respective said release bearings being spaced apart axially but overlapping one another radially.

5. A release mechanism as in claim 4 wherein said bearing bodies of respective said release bearings are arranged substantially in the same radial region.

6. A release mechanism as in claim 1 further comprising a sleeve-like guide element on which said sleeve-like action element is supported.

7. A release mechanism as in claim 6 wherein said guide is fixed to a stationary assembly.

8. A method for assembling a release mechanism for a double clutch assembly comprising a first clutch region and a second clutch region which are arranged coaxially about an axis of rotation, said method comprising providing a first release bearing for transmitting release force to a first force accumulator of the first clutch region, providing a first action region for transmitting release force from a first release force transmission member to said first release bearing, providing a second release bearing for transmitting release force to a second force accumulator of the second clutch region, said second release bearing being arranged axially in succession with said first release bearing with respect to said axis of rotation, providing a second action region for transmitting release force from a second release force transmission member to said second release bearing, said first and second release force transmission members acting on the same axial side of respective first and second action regions, said second action region comprising a sleeve-like action element having opposed end regions, pushing said first release bearing onto said sleeve-like element so that said first and second release bearings are axially aligned with respect to said axis of rotation, and forming said end regions with respective radially outward extending holding regions for axially retaining said first release bearing on said sleeve-like element between said holding regions.

9. A method as in claim 8 wherein one of said holding regions is formed prior to pushing said first release bearing onto said sleeve-like element, and the other of said holding regions is formed after pushing said first release bearing onto said sleeve-like element.

10. A method as in claim 9 further comprising connecting said second release bearing to one of said holding regions.

* * * * *